(12) United States Patent
Leister

(10) Patent No.: US 10,268,080 B2
(45) Date of Patent: *Apr. 23, 2019

(54) OPTICAL LIQUID-CRYSTAL PHASE MODULATOR

(71) Applicant: SEEREAL TECHNOLOGIES S.A., Munsbach (LU)

(72) Inventor: Norbert Leister, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,372

(22) Filed: Jun. 6, 2017

(65) Prior Publication Data
US 2017/0269436 A1   Sep. 21, 2017

Related U.S. Application Data

(63) Continuation of application No. 14/770,885, filed as application No. PCT/EP2014/053667 on Feb. 26, 2014, now Pat. No. 9,671,649.

(30) Foreign Application Priority Data

Feb. 27, 2013   (DE) .................. 10 2013 101 964

(51) Int. Cl.
*G02F 1/139*   (2006.01)
*G02F 1/1337*   (2006.01)
(Continued)

(52) U.S. Cl.
CPC ...... *G02F 1/133723* (2013.01); *G02F 1/1393* (2013.01); *G02F 1/133784* (2013.01);
(Continued)

(58) Field of Classification Search
CPC ... G02F 2001/134381; G02F 1/134363; G02F 1/29; G02F 1/292; G02F 1/1393
See application file for complete search history.

(56) References Cited

U.S. PATENT DOCUMENTS

| | | |
|---|---|---|
| 6,078,375 A | 6/2000 | Matsumoto et al. |
| 7,564,510 B2 | 7/2009 | Miyachi et al. |

(Continued)

FOREIGN PATENT DOCUMENTS

| | | |
|---|---|---|
| DE | 10 2009 028 626 A1 | 1/2011 |
| EP | 0 903 614 A2 | 3/1999 |

(Continued)

OTHER PUBLICATIONS

English translations of International Search Report, dated May 9, 2014, and Written Opinion issued in International Application No. PCT/EP2014/053667.

*Primary Examiner* — Thanh Nhan P Nguyen
(74) *Attorney, Agent, or Firm* — Saul Ewing Arnstein & Lehr LLP

(57) ABSTRACT

A phase modulator for polarized light, comprising a first substrate with a first surface and a second substrate with a second surface, a liquid crystal layer between the two substrates and an electrode arrangement. The phase modulator is usable as a variable deflection grating, and liquid crystal materials which are currently conventional are usable for its production. A phase modulator has an out-of-plane angle of the liquid crystal molecules next to the two surfaces whose magnitude is greater than 0 but less than or equal to 45 degrees, and an electrode arrangement controllable such that an in-plane component of the liquid crystal molecule orientation is adjustable in an angle range of up to 180 degrees, and the rotation sense of the liquid crystal molecules next to the first surface is opposite to the rotation (Continued)

sense of the liquid crystal molecules next to the second surface.

18 Claims, 10 Drawing Sheets

(51) Int. Cl.
*G02F 1/1343* (2006.01)
*G02F 1/29* (2006.01)
*G02F 1/137* (2006.01)

(52) U.S. Cl.
CPC .. *G02F 1/133788* (2013.01); *G02F 1/134309* (2013.01); *G02F 1/134363* (2013.01); *G02F 1/292* (2013.01); *G02F 2001/13706* (2013.01); *G02F 2001/133746* (2013.01); *G02F 2203/50* (2013.01)

(56) References Cited

U.S. PATENT DOCUMENTS

| | | |
|---|---|---|
| 8,860,896 B2 | 10/2014 | Kroll et al. |
| 2005/0151915 A1* | 7/2005 | Nomura ............ G02F 1/133711 349/141 |
| 2006/0072056 A1 | 4/2006 | Nagai et al. |
| 2012/0206667 A1 | 8/2012 | Kroll et al. |
| 2012/0293758 A1 | 11/2012 | Chang et al. |
| 2014/0055692 A1 | 2/2014 | Kroll et al. |

FOREIGN PATENT DOCUMENTS

| | | |
|---|---|---|
| WO | 2005/071477 A1 | 8/2005 |
| WO | 2010/149587 A2 | 12/2010 |
| WO | 2011/039286 A1 | 4/2011 |
| WO | 2011/067265 A1 | 6/2011 |

* cited by examiner

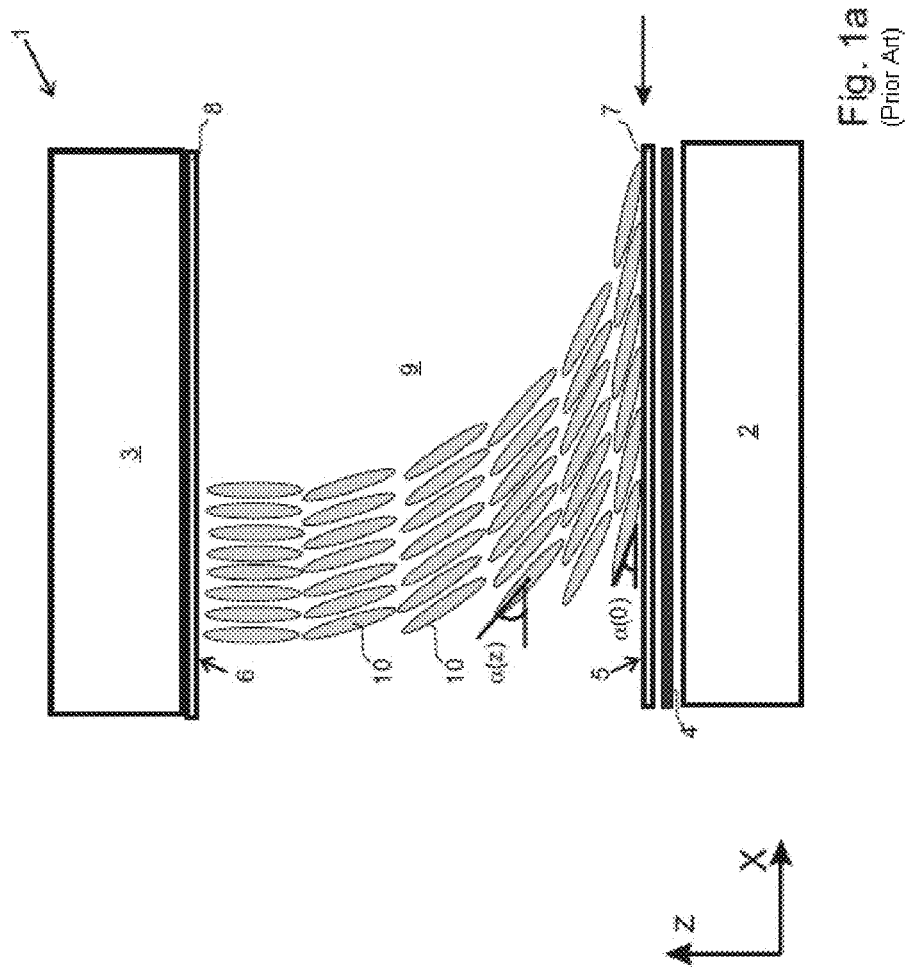

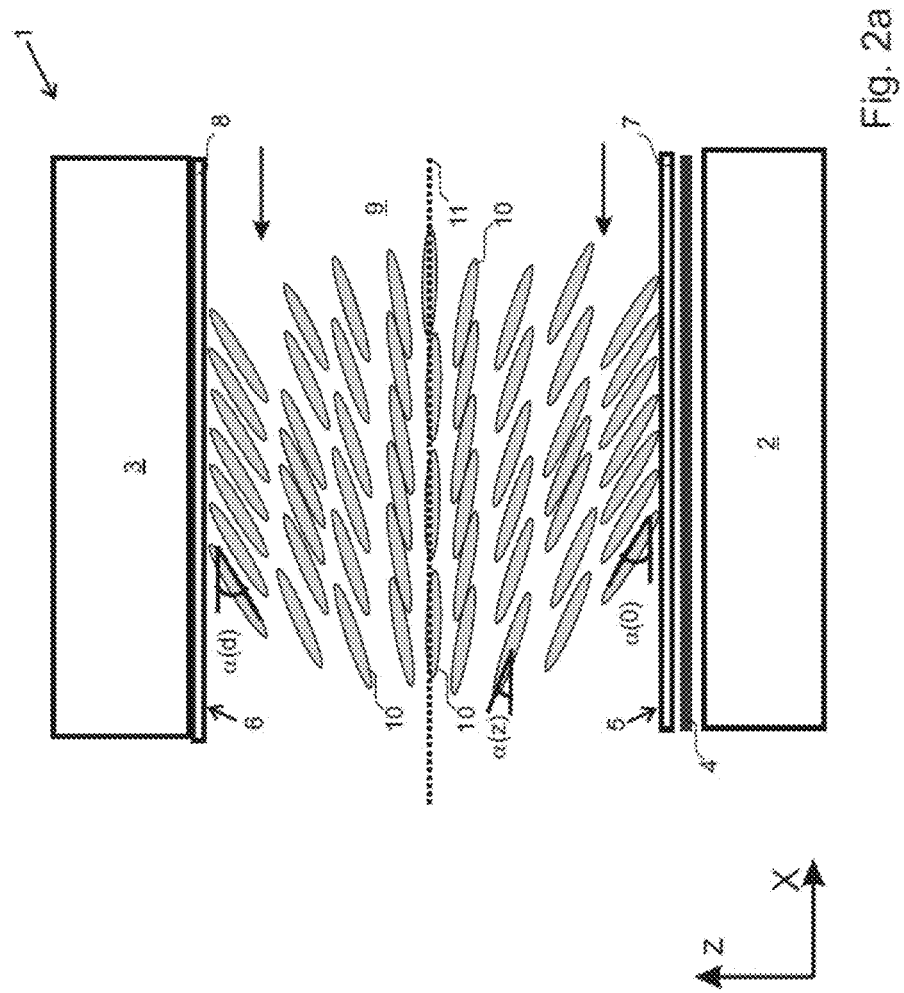

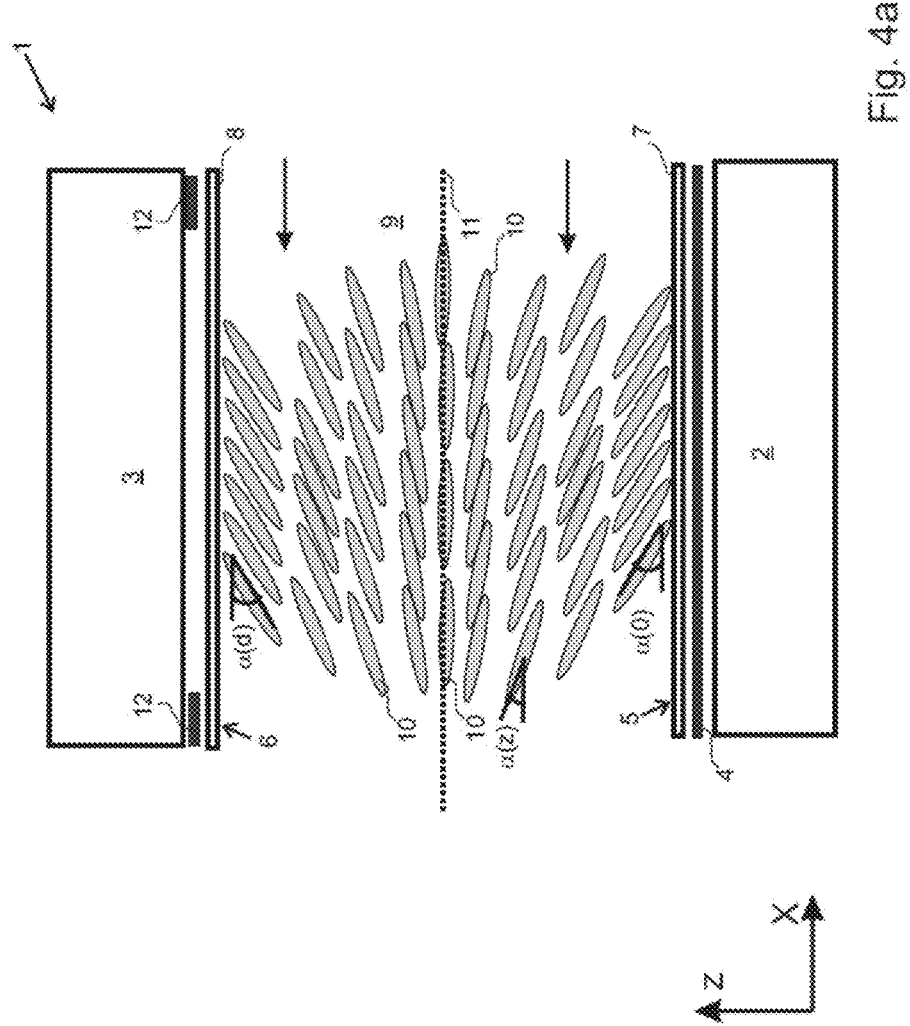

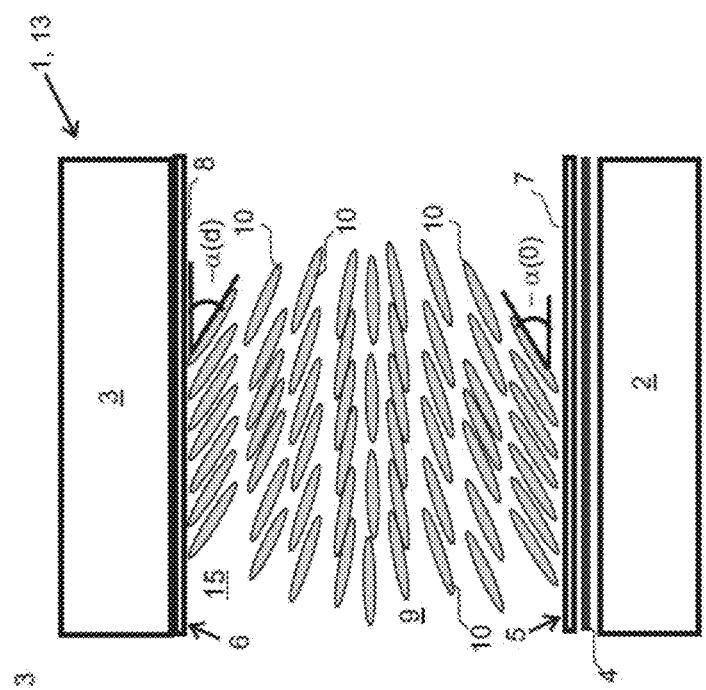
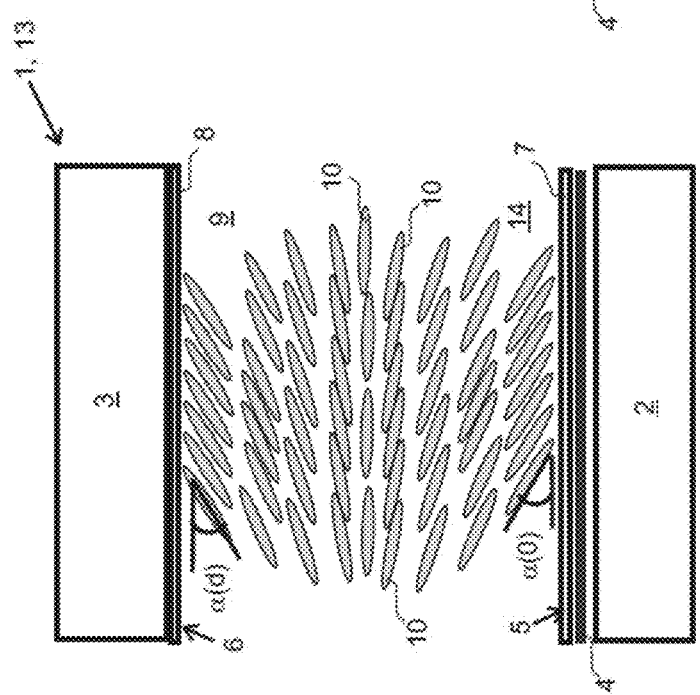

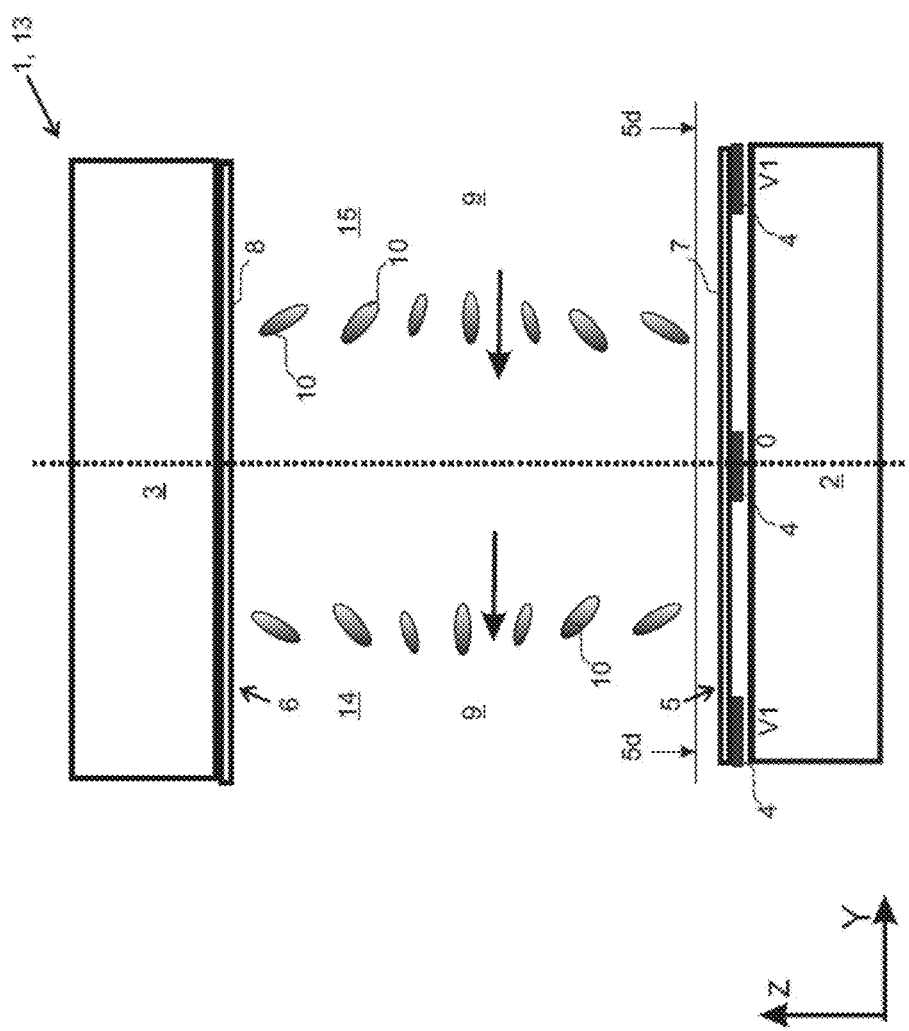
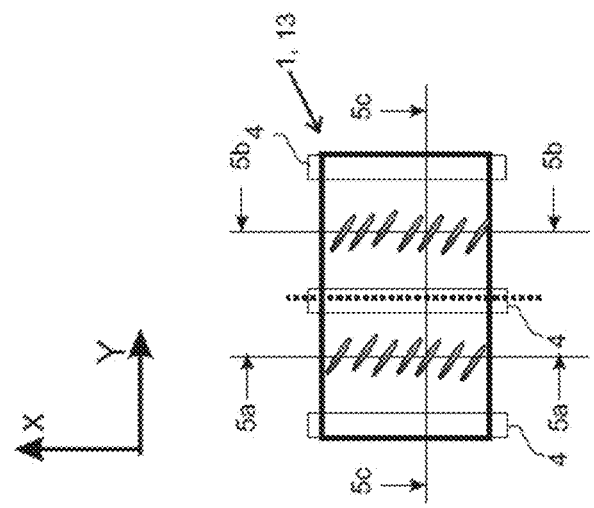
Fig. 5c
Fig. 5d

OPTICAL LIQUID-CRYSTAL PHASE MODULATOR

CROSS REFERENCE TO RELATED APPLICATIONS

This application is a continuation of U.S. application Ser. No. 14/770,885, filed on Aug. 27, 2015, which claims the priority of PCT/EP2014/053667, filed on Feb. 26, 2014, which claims priority to German Application No. DE 10 2013 101 964.1, filed on Feb. 27, 2013, the entire contents of each of which are incorporated fully herein by reference.

FIELD OF THE INVENTION

The present invention relates to a phase modulator for polarized light, comprising a first substrate with a first surface and a second substrate with a second surface, a liquid crystal layer (also referred to as an LC layer) between the two substrates and an electrode arrangement, based on an LC alignment (LC=liquid crystal) with a large pretilt angle, as well as to a method for producing such a phase modulator.

BACKGROUND OF THE INVENTION

WO 2011/067265 A1 describes a phase modulator for modulating light interacting with the phase modulator. The phase modulator described in WO 2011/067265 A1 for modulating the phase of circularly polarized light contains inter alia a first and a second substrate and a liquid crystal layer between the two substrates, the surfaces of the substrates being configured in order to orientate the liquid crystal molecules next to the first surface in a direction which is substantially parallel to the first surface, and to orientate the liquid crystal molecules next to the second surface in a direction which is substantially perpendicular to the second surface. Such an orientation is also referred to as hybrid alignment of a nematic (HAN) liquid crystal.

As disclosed by WO 2011/067265 A1, such a HAN configuration is used in order selectively to achieve a rotation of the in-plane component of the liquid crystal molecule orientation, for example from 0 to +90 degrees or from 0 to −90 degrees, as a function of the sign of the electric field applied to the electrodes, and therefore to achieve overall a phase modulation of from 0 to $2\pi$ by such control of the applied field. The thickness of the LC layer is in this case preferably selected in such a way that its optical function corresponds to a $\lambda/2$ plate.

The sign-dependent rotation in the electric field is in this case based on flexoelectric polarization. This polarization is based on a mechanical deformation of the LC, or the LC molecules, by the hybrid alignment.

WO 2011/067265 A1 also describes such a phase modulator, which is configured in such a way that the light interacting with the phase modulator can be variably deviated as a result of diffraction in a predeterminable direction, and that the function of a variably adjustable deflection grating can thereby be achieved.

A variable deflection grating based on phase modulation, used in a manner comparable to that described in DE 10 2009 028 626 A1, may be produced by individual driving of individual in-plane electrodes.

Because of the hybrid alignment, the LC molecules are partially oriented out-of-plane, specifically as an average value over the layer thickness approximately at 45 degrees, with a linear variation between approximately 0 and 90 degrees from one surface of the liquid crystal layer to the other.

The effective birefringence for light which passes through an LC layer, the LC molecules being tilted at an angle $\beta$ with respect to the direction in which the light passes through, is $$\Delta n_{eff} = n_2 - \frac{n_1 \cdot n_2}{\sqrt{n_1^2 \cdot \sin^2\beta + n_2^2 \cdot \cos^2\beta}}$$

where $n_1$ and $n_2$ are the ordinary and extraordinary refractive indices of the liquid crystal with the birefringence $\Delta n = n_2 - n_1$.

For a hybrid alignment, the angle $\beta$ varies over the layer thickness between 0 and 90 degrees, and $\Delta n_{eff}$ consequently also varies over the thickness of the LC layer. The effective optical path difference (opd), which in the case of uniform LC orientation is usually described as opd=d $\Delta n$ with the layer thickness d and the birefringence $\Delta n$, is in this case $$opd = \int_0^d \Delta n_{eff}(z) dz$$

For hybrid orientation, an average effective birefringence over the layer thickness is approximately $\overline{\Delta n_{eff}} \approx 0.5\, \Delta n$ and the optical path difference is $opd_{HAN} \approx 0.5$ d $\Delta n$.

The effective optical path difference for light passing perpendicularly through the liquid crystal layer is less than the case would be with a liquid crystal layer in which the liquid crystal molecules are oriented in-plane. In order to achieve the optical function of a $\lambda/2$ plate, the product of the layer thickness of the LC layer and the birefringence of the LC material must therefore be relatively large. In the case of a layer thickness of 3 micrometers, approximately a $\Delta n$ of 0.18 is required in order to adjust a $\lambda/2$ plate for green light. Specifically, with these numerical values $opd_{HAN} \approx 0.5 \cdot 0.18 \cdot 3$ $\mu m = 0.27$ $\mu m$, which corresponds approximately to half the value of the wavelength of green light.

Usually, it is difficult to achieve this birefringence of 0.18 or a similar value as a material property in combination with, at the same time, a low viscosity. The use of an LC material with increased viscosity, however, compromises the maximum adjustable adjustment speed of the variably adjustable phase modulator.

The sign-dependent rotation of the liquid crystal molecules in the electrical in-plane field is based on flexoelectric polarization. The interaction of the polarization with the field is linear. Besides flexoelectric polarization, a quadratic interaction of the dielectric anisotropy $\Delta\varepsilon$ with the field also takes place.

In particular, the dielectric interaction may have the effect that, with higher fields, besides the desired rotation of the in-plane component of the LC molecule orientation an undesired rotation, coupled therewith, of the out-of-plane component of the LC molecule orientation also takes place in the field. This rotation of the out-of-plane component of the LC molecule orientation has the effect that the LC layer no longer fulfills the optical function of a $\lambda/2$ plate. In the worst case, the optical path through the LC layer may be doubled. This is because if all the LC molecules are oriented in-plane, i.e. parallel to the substrates, the optical path would be $opd_{parallel} = d\, \Delta n = 2 \cdot opd_{HAN}$.

A change in the optical path with the in-plane rotation angle leads, particularly when using the phase modulator as a variable deflection grating, to a reduced diffraction efficiency of the deflection grating. Less light thus enters the desired diffraction order, and under certain circumstances undesired perturbing light enters other diffraction orders.

Correct functioning of the HAN phase modulator as a variable deflection grating therefore requires a liquid crystal material with a high flexoelectric coefficient and, at the same time, a low dielectric anisotropy $\Delta\varepsilon$. Preferably, $\Delta\varepsilon$ lies in the range of less than 2, ideally less than 0.2. As described above, this is required in combination with a high birefringence $\Delta n$ of the liquid crystal material, preferably in the range of from 0.15 to 0.2.

It would be desirable to have a phase modulator which can also be used as a variable deflection grating, which avoids the described disadvantages and which in particular makes it possible to use liquid crystal materials whose material parameters lie closer to standard values of currently used materials.

For example, the birefringence $\Delta n$ of liquid crystal materials used at present in displays typically lies in the range of from 0.8 to 0.10 and the dielectric anisotropy $\Delta\varepsilon$ typically lies in the range of from 5 to 10.

U.S. Pat. No. 7,564,510 B2 describes a liquid crystal display device which contains pixels, each pixel being subdivided into a number of regions, and the direction of an electric field—substantially parallel to the substrates—in one of the regions being opposite to the field direction in another region, and in the case of which there is furthermore a polarization in the liquid crystal layer when no field is applied. U.S. Pat. No. 7,564,510 B2 therefore describes a pixel structure which generates a uniform brightness impression for large observer angle in that different regions of a pixel compensate for one another in the overall brightness of the pixel for different viewing directions. For example, when observed from one particular direction, a first region of the pixel appears brighter and a second region appears darker. Observed from another direction, the situation is reversed. Yet since the eye cannot resolve the regions of the pixel individually, there is a uniform brightness impression.

To this end, in U.S. Pat. No. 7,564,510 B2, a rotation of the liquid crystal molecule orientation as a function of the sign of the electric field is used so that the liquid crystal molecules in different regions of a pixel thus rotate oppositely. It is described that this sign-dependent rotation may likewise be based on flexoelectric polarization.

FIG. 3 of U.S. Pat. No. 7,564,510 B2 describes a configuration with parallel rubbing on the two surfaces of the substrates. This leads to a mirror-symmetrically equal alignment of the LC molecules on the two substrates (with a mirror plane parallel to the substrates in the middle of the LC layer) and a splay deformation in the LC layer between the two substrates. This splay deformation generates flexoelectric polarization.

The arrangement described in U.S. Pat. No. 7,564,510 B2 would not, however, be usable as a phase modulator since the different regions of a pixel would respectively generate different phase values, so that a full pixel would not have uniform phase modulation.

SUMMARY OF THE INVENTION

It is therefore an object of the present invention to describe a phase modulator which avoids the aforementioned disadvantages, which can furthermore be used as a variable deflection grating, and for the production of which it is possible in particular to use liquid crystal materials which are currently conventional.

The object is achieved by a phase modulator as claimed in claim 1.

A phase modulator, which is used in particular for modulating the phase of polarized light interacting with the phase modulator, which is generally circularly polarized light, comprises a first substrate, which has a first surface, and a second substrate, which has a second surface, the two substrates being arranged facing one another, a liquid crystal layer, which is arranged between the two substrates and contains liquid crystal molecules, an electrode arrangement on at least one of the substrates, the two surfaces of the substrates being configured in order to orientate the liquid crystal molecules next to the respective surface in a direction which respectively forms an out-of-plane angle with the respective surface of the respective substrate.

In the phase modulator according to the invention, the magnitude of this is more than 0 degrees but less than or equal to 45 degrees. The out-of-plane angle, or polar angle, that is to say the angle which the optical long axis of the liquid crystal molecules makes with the surface of the respective substrate, is also known as the pretilt angle in so far as this describes the initial state of the orientation of these liquid crystal molecules in relation to the respective substrate—i.e. without reorientation by application of an electric field by means of the electrode arrangement. Here, orientation is always intended to mean the alignment of the optical long axis of the liquid crystal molecule or of another alignable birefringent material.

In the phase modulator according to the invention, furthermore, the electrode arrangement can be driven in such a way that an in-plane component w, also known as azimuthal component, of the liquid crystal molecule orientation can be adjusted in an angle range of up to 180 degrees, and that the rotation sense of the liquid crystal molecules which are next to the first surface is opposite to the rotation sense of the liquid crystal molecules which are next to the second surface.

In other words, a phase modulator in which the aforementioned problems are avoided, or at least reduced, is configured as follows:

It comprises a first and a second substrate, an electrode arrangement and a liquid crystal layer comprising liquid crystal molecules. The first substrate is arranged facing the second substrate. The liquid crystal layer is arranged between the two substrates. The first substrate has a first surface, and the second substrate has a second surface. The first surface is configured in order to orientate the liquid crystal molecules next to the first surface in a direction which forms a first out-of-plane angle $\alpha(0)$, or a first polar angle, with respect to the first surface of the first substrate. The magnitude of $\alpha(0)$ is in this case greater than 0 degrees but less than or equal to 45 degrees. The second surface is configured in order to orientate the liquid crystal molecules next to the second surface in a direction which forms a second out-of-plane angle $\alpha(d)$, or a polar angle, with respect to the second surface of the second substrate. The magnitude of $\alpha(d)$ is likewise greater than 0 degrees but less than or equal to 45 degrees. According to the invention, the rotation sense of the out-of-plane angles $\alpha(0)$ and $\alpha(d)$, and therefore of the liquid crystal molecules next to the surfaces, is opposite relative to the surface. In other words, the signs of the angles $\alpha(0)$ and $\alpha(d)$ are different. The angle $\alpha$ moreover corresponds to the angle $\beta$ described above for the special case in which light passes through the phase modulator perpendicularly. In the preferred case of the use of the phase modulator according to the invention, the light enters the phase modulator perpendicularly, although any other entry angles may be envisioned.

In this case, the electrode arrangement can be driven in such a way that an in-plane component, or azimuthal component, of the liquid crystal molecule orientation can be adjusted in an angle range of up to 180 degrees.

This ensures that the liquid crystal molecules with their in-plane component can assume any possible position, since liquid crystal molecules are optically symmetrical molecules which thus form an ellipsoid in relation to their optical properties.

In the phase modulation of the polarized light, carried out by the phase modulator, deflection of the light may also take place. The light modulator described here may thus also be used as a phase deflector.

In a special embodiment of the phase modulator according to the invention, the "liquid crystal layer", which is arranged between the two substrates, in this case contains a different alignable birefringent material instead of the liquid crystal molecules or in addition to the liquid crystal molecules. Often, phase modulators are configured with a liquid crystal material, which is the best-characterized material group, including a multiplicity of specific liquid crystal materials, for such optical purposes. In principle, however, other alignable birefringent materials may also be used here, for example nonspherical nanoparticles of different materials, i.e. different dielectric materials or metals, and in particular carbon nanotubes. These may then be used in a similar way to the liquid crystal molecules described here. They are likewise symmetrical in relation to their optical properties.

In one embodiment of the phase modulator according to the invention, the in-plane component can be adjusted between $-\varphi_1$ and $+\varphi_2$ degrees, with $\varphi_1$, $\varphi_2 \leq 90$ degrees, in relation to a predeterminable average orientation which corresponds to the orientation when no voltage is applied. Values of $\varphi_1$, $\varphi_2$ with 70 degrees $\leq \varphi_1$, $\varphi_2 \leq 90$ degrees are preferred in this case.

In a particularly preferred phase modulator according to the invention, the in-plane component can be adjusted between −90 and +90 degrees, in relation to a predeterminable average orientation.

According to a preferred embodiment, the angles $\alpha(0)$ and $\alpha(d)$ are equal in magnitude but differ in sign, so that there is a mirror-image orientation of the LC molecules with respect to one another at the two surfaces.

If this mutual mirror-image orientation of the liquid molecules on the two surfaces continues over planes parallel to the surfaces respectively with equal distances from the two surfaces, and if a mirror plane or symmetry plane in relation to the mirror-image orientation can be imagined in the middle of the liquid crystal layer between the two surfaces of the two substrates, then the phase modulator in a preferred embodiment according to the invention has a splay deformation across the liquid crystal layer.

The magnitude of the out-of-plane angles $\alpha(0)$ and $\alpha(d)$ in a particularly preferred embodiment of the phase modulator according to the invention respectively lies in a range of between 20 and 40 degrees. In particular, the magnitudes of the angles $\alpha(0)$, $\alpha(d)$ may be essentially equal.

More particularly preferably, the phase modulator is configured in such a way that the light interacting with the phase modulator can be variably deflected in a predeterminable direction because of diffraction. The phase modulator according to the invention, in particular when it is configured and driven in such a way that it operates as a phase deflector, may be used in a manner comparable to that of the phase deflector described in WO 2011/039286 A1. The disclosure content of WO 2011/039286 A1 is therefore fully incorporated here. The diffractive elements, for example phase modulators or phase deflectors, which can be used in holographic displays for observer tracking, are described for example in DE 10 2009 028 626 A1 or in WO 2010/149587 A2, where they are referred to as a diffraction device. Since the phase modulator or phase deflector according to the invention can be used inter alia in a manner comparable to that of the diffraction device described in DE 10 2009 028 626 A1 or in WO 2010/149587 A2, the disclosure content of DE 10 2009 028 626 A1 and that of WO 2010/149587 A2 are fully incorporated here.

A preferred configuration, in which a phase modulator, in which $\alpha(0)$ and $\alpha(d)$ are equal in magnitude but differ in sign, so that there is a mirror-image orientation of the LC molecules with respect to one another at the two surfaces, and in which the magnitude of $\alpha(0)$ and $\alpha(d)$ lies in the range between 20 degrees and 40 degrees, has the following advantages:

The average value over the LC layer thickness of the magnitude of the out-of-plane angle of the LC orientation corresponds to half the magnitude of $\alpha(0)$. In the case in which $\alpha(0)=30°$, for example, the LC molecules are oriented on average 15 degrees out-of-plane.

With an angle of 15 degrees, for example, $\Delta n_{eff} \approx 0.95 \, \Delta n$ The optical path difference, which is in turn given as an integral over the thickness of the LC layer, opd=$\int_0^d \Delta n_{eff}(z)$ dz, is significantly greater than in the case of a hybrid orientation.

The product of the layer thickness and the birefringence, which is required in order to adjust a $\lambda/2$ plate, thus does not differ substantially from a fully in-plane oriented LC.

For example, with a full in-plane orientation of the liquid crystal molecules, a layer thickness of 3 micrometers and a $\Delta n$ of 0.09 would be required in order to produce a $\lambda/2$ plate for green light. In the described arrangement with $\alpha(0)$ of 30 degrees (and with $\alpha(d)$ of −30 degrees) a $\Delta n$ of about 0.095 would instead be required in order to produce a $\Delta/2$ plate for green light. This $\Delta n$ lies in a range which is typical for LC mixtures in displays.

The orientation of the liquid crystal molecules with a different sign of the angle at the two surfaces generates a splay deformation. A flexoelectric polarization is generated by the deformation. This allows sign-dependent switching, or alignment, of the LC molecules.

The flexoelectric polarization is defined as $$P_f = e_s n(\nabla \cdot n) + e_b n \times \nabla \times n$$

Here, n is the director, that is to say a vector in the direction of the longitudinal axis of the LC molecules, $\nabla$ is the del (nabla) operator, $\nabla \cdot n$ is the divergence of the director n, x denotes the cross product, $\nabla \times n$ is the rotation of the director n, $e_s$ is the splay flexoelectric coefficient, and $e_b$ is the bend flexoelectric coefficient.

The flexoelectric coefficients $e_s$ and $e_b$ represent material constants, the value of which depends on the geometrical shape of the LC molecules and on the electric dipole and quadrupole moments of these LC molecules.

In theoretical models of flexoelectric polarization, it is described for example that an electric quadrupole moment contributes to the two coefficients es and eb even in the case of an ideally rice-grain shaped LC molecule.

Electric dipole moments contribute when there is a deviation of the shape of the LC molecules from the model of a rice grain. A more pear-shaped molecule shape in combination with a longitudinal electric dipole moment (i.e. placed in the direction of the long molecule axis) favors a high splay flexoelectric coefficient $e_s$. A more banana-shaped molecule shape in combination with a transverse electric dipole moment (placed transversely to the long molecule axis) favors a higher bend flexoelectric coefficient $e_b$.

A contribution of the splay flexoelectric coefficient es to the flexoelectric polarization occurs, according to the equation above, in particular when the divergence $\nabla \cdot n$ of the director is nonzero.

In the case of an LC orientation with an out-of-plane angle $\alpha(0)$ on one substrate and an angle $\alpha(d)$ different to $\alpha(0)$ (in sign and/or magnitude) on the other substrate, there is such a nonzero divergence of the director n.

The rotation $\nabla \times n$ of the director n in the case of such an orientation of the LC molecules is, however, small, so that the bend flexoelectric coefficient $e_b$ in this case contributes only little to the flexoelectric polarization.

Advantageously, such LC molecules as have a high splay flexoelectric coefficient $e_s$ are thus used in this arrangement.

A rotation of the in-plane component of the liquid crystal molecule orientation of, for example, from 0 to +90 degrees, or from 0 to −90 degrees, takes place selectively as a function of the sign of the electric field.

For a fixed LC material, however, the splay deformation and therefore also the flexoelectric polarization advantageously increase with the magnitude of the angles $\alpha(0)$ and $\alpha(d)$. Small angles, for example 5 degrees, would typically lead only to a small polarization. In the case of large angles, for example of 45 degrees, although there is a large flexoelectric polarization, in the case of large angles, the $\Delta n_{eff}$ disadvantageously becomes smaller. The preferred range of from 20 to 40 degrees for $\alpha(0)$ and $\alpha(d)$ represents a compromise between the two factors.

In this case as well, the interaction with an electric field takes place both via the flexoelectric polarization and via the dielectric anisotropy. The dielectric anisotropy $\Delta \varepsilon$ can have the effect that, in the case of a strong in-plane field, the out-of-plane orientation of the liquid crystals changes.

Since, however, as shown above, the difference in the optical path between a full liquid crystal in-plane orientation and an orientation with for example +/−30 degrees on the surfaces is small, the negative effect of the dielectric interaction on the optical function as a phase modulator, and in particular also as a variable deflection grating, is small. That is to say, the diffraction efficiency of a variable deflection grating is only insubstantially reduced by the $\Delta \varepsilon$.

On the other hand, a somewhat higher dielectric anisotropy $\Delta \varepsilon$ advantageously makes it possible to use lower voltages for driving the phase modulator.

In a preferred embodiment, therefore, a liquid crystal layer which contains a liquid crystal material with a dielectric anisotropy of $\Delta \varepsilon \geq 5$ is used. In the preferred configuration, therefore, both the birefringence $\Delta n$ (as described above) and the dielectric anisotropy $\Delta \varepsilon$ lie in a range which is typical for liquid crystal materials such as are used in displays. In addition, however, increased flexoelectric coefficients are furthermore preferred, in particular an increased splay-flexo coefficient $e_s$, for example of $e_s \geq 5$ pC/m (picocoulomb/meter) or even of $e_s \geq 10 \cdot$pC/m.

In one embodiment, the electrodes are arranged only on a first substrate. The electrodes on the first substrate are preferably individually controllable.

In another embodiment, in-plane electrodes are used on the two substrates, the electrodes on one substrate being oriented at an angle of approximately 90 degrees relative to the electrodes on the other substrate. In this case, "in-plane" electrodes or "in-plane" electrode arrangement means that an electrode arrangement parallel to the substrate surface is involved.

Here again, an increased dielectric anisotropy $\Delta \varepsilon$ is preferably used. The electrodes on the first substrate are then used for the sign-dependent switching on of the electric field by a combination of flexoelectric and dielectric interaction. With an increased rotation angle, with increased $\Delta \varepsilon$ the flexoelectric polarization in this case also decreases since the LC molecules are oriented more strongly in-plane by the dielectric interaction. The electrodes on the second substrate are used for actively switching off the electric field. The rotation of the LC molecules is carried out while being dominated by the dielectric interaction. In this way, rapid switching can be carried out in both directions.

In particular, such a phase modulator, which contains both an electrode arrangement on the first substrate and an electrode arrangement on the second substrate, may advantageously have an electrode arrangement on the second substrate in the form of two inter-engaged combs or comb-like structures, between which a global voltage value can be adjusted. Individual controlling of the electrodes on the second substrate is therefore unnecessary. This embodiment according to the invention allows a rapid switching behavior: both switching processes, both switching on and switching off, can therefore respectively be controlled actively by an electric field.

In another embodiment, which is less preferred, it is also possible to use an LC material with a very high splay flexoelectric coefficient $es \geq 20$ pC/m and a very low dielectric anisotropy $\Delta \varepsilon \leq 0.2$. In this case, the interaction of the flexoelectric polarization with the electric field would also dominate for large in-plane rotation angles of the LC molecule and active switching off can be carried out by an electric field with the opposite sign. A phase modulator with rapid switching times can likewise be produced in this way. The embodiment advantageously only requires electrodes on one substrate. It is less preferred merely because an LC material with the described properties is more difficult to produce.

The phase modulator according to the invention may now be used in a spatial light modulator. A multiplicity of pixels are arranged regularly next to one another therein, a uniform adjustable phase value respectively being generated over the entire surface of a pixel by using the above-described structure of the phase modulator according to the invention.

Advantageously, each pixel is in this case divided into two regions, which respectively have a mirror-symmetrically opposite orientation of the liquid crystal molecules near the surfaces of the substrates.

In order to produce the phase modulator according to the invention, a method is used wherein, on a first substrate and a second substrate, a surface is formed in such a way that an alignment layer is created, by which the liquid crystal molecules which enter onto or into the vicinity of this surface adjust an intended orientation with a desired out-of-plane angle. The two substrates are subsequently assembled facing one another by using spacers, and the intermediate space is filled with liquid crystal material. In this case, according to the invention, the out-of-plane angle, which in this initial orientation is also referred to as the pretilt angle, as well as the anchoring energy on the two substrates, are adjusted by a combination of chemical properties of the alignment layers, process parameters of the production of the alignment layers, and the chemical properties of the liquid crystal material, the respective out-of-plane angle, or pretilt angle, on the two substrates lying in the range of between 0 and 45 degrees, preferably between 20 and 40 degrees.

The best-known method, which is conventional in the industrial production of LC displays, for adjusting a particular orientation (alignment) and surface anchoring of LC molecules on a substrate is mechanical rubbing (or buffing) of an orientation layer (alignment layer). Polyimides are typically used as an orientation layer.

By a combination of chemical properties of the alignment layer and parameters of the rubbing process (for example the application pressure), the anchoring energy as well as the pretilt angle are adjusted. The pretilt angle furthermore also depends on the chemical properties of the LC material.

In the arrangement described according to the invention, the pretilt angle on a first substrate would thus correspond to the out-of-plane angle $\alpha(0)$, and the pretilt angle on a second substrate would correspond to the out-of-plane angle $\alpha(d)$. These angles are set up when the substrates previously treated by rubbing are assembled by using spacers and the intermediate space is filled with LC.

With the conventionally used polyimide alignment materials and rubbing, pretilt angles in the range of about 1 degree to 8 degrees are achievable.

A configuration of the invention in which angles $\alpha(0)$ and $\alpha(d)$ are adjusted by conventional mechanical rubbing of polyimide would preferably use a polyimide which adjusts an angle at the upper end of the range achievable by rubbing, i.e. pretilt angles of 7-8 degrees. It is also known that chemical properties of the LC material have an effect on the pretilt angle. Preferably, LC mixtures whose chemical composition favors a somewhat higher pretilt angle are used.

For the switching speed of a phase modulator according to the invention, it is however advantageous if an angle can be adjusted which is higher than the range achievable by conventional mechanical rubbing.

In another configuration of the invention, therefore, the out-of-plane angles $\alpha(0)$ and $\alpha(d)$ are adjusted not by means of rubbing but by means of photoalignment.

Instead of the conventional polyimide alignment layers for rubbing, a photo-orientable alignment layer is used instead. This alignment is exposed by means of UV light. The out-of-plane or pretilt angle can in this case be adjusted by adapting the exposure dose of the UV light.

Two substrates exposed with a correspondingly adapted exposure dose are then assembled to form a cell, so that the angles $\alpha(0)$ and $\alpha(d)$ are set up on the two substrates.

Further methods with which high pretilt angles can be adjusted, and which may therefore be used for other configurations of the invention, are
- The use of alignment layers consisting of obliquely vapor-deposited SiO2 or SiNx layers,
- The use of a mixture respectively of one polyimide for vertical alignment and one for horizontal alignment. By means of a suitable mixing ratio an increased pretilt can also be adjusted by conventional rubbing in this case.
- The use of a doped polyimide layer, in which the surface energy of the polyimide is modified by means of a dopant, and the pretilt is adjusted by means of this influencing of the surface energy.

The invention is not restricted to the configurations described.

There are now various possibilities for advantageously configuring and refining the teaching of the present invention. In this regard, reference is to be made on the one hand to the claims dependent on patent claim 1, and on the other to the following explanation of the preferred exemplary embodiments of the invention with the aid of the figures. The first configurations and refinements of the teaching will also be explained in general in connection with the explanation of the preferred exemplary embodiments of the invention with the aid of the figures.

BRIEF DESCRIPTION OF THE DRAWINGS

The figures respectively show in a schematic representation:

FIG. 1a is a sectional view of a phase modulator according to the prior art,

DETAILED DESCRIPTION OF THE INVENTION

Figure 1B:
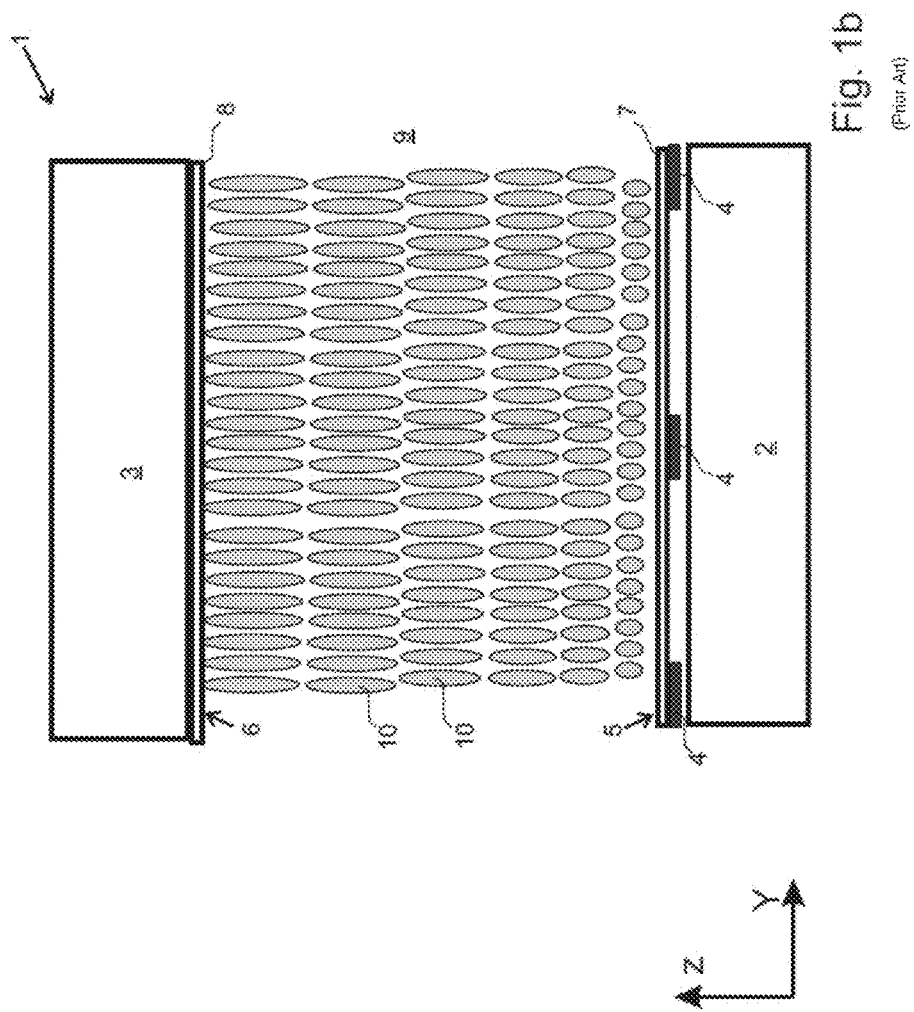
FIG. 1b is a sectional view, rotated 90 degrees, of the phase modulator of FIG. 1a, FIG. 2a is a sectional view of a first exemplary embodiment of a phase modulator according to the invention.

In the figures, components or elements which are the same are denoted by the same references.

FIG. 1a schematically shows a section through a phase modulator 1 according to the prior art. This phase modulator 1 comprises two glass substrates 2, 3. In principle, at least one of the glass substrates 2, 3 may also be replaced with another substrate material. One of the substrates could, for example, also be configured to be optically reflective. At least one of the substrates, however, is generally configured to be optically transparent for the light interacting with it. Electrodes 4 are arranged on the first glass substrate 2. An electrode 4 is schematically represented in the plane of the drawing. Between this electrode 4 and further electrodes (not represented), which are arranged in front of or behind the plane of the drawing, it is possible to apply an electric field which is essentially perpendicular to the plane of the drawing. FIG. 1a shows the LC molecules 10 respectively in "rice-grain shape", the LC orientation with the electric field switched off being represented. The glass substrates 2, 3 respectively have a surface 5, 6. In this example, the surfaces of the glass substrates 2, 3 are respectively coated with polyimide 7, 8 (PI), so that the surface 5, 6 of the respective polyimide layer 7, 8 acts as a boundary layer for the LC molecules 10, or for the LC layer 9. Close to the lower polyimide layer 7, the LC molecules 10 of the LC layer 9 are oriented because of the surface structure of the polyimide layer 7 in such a way that they are approximately parallel to the surface 5. The expression approximately parallel may also include a small angle $\alpha(0)$ in the range of about 1 to 3 degrees. The surface structure of the polyimide layer 7 is generated here by "rubbing", i.e. mechanical brushing of the polyimide layer 7. Close to the surface 6 of the upper polyimide layer 8, the LC molecules 10 are oriented approximately perpendicularly to the surface 6 because of the surface property of the polyimide layer 8.

FIG. 1b shows for better understanding a detail of a view, rotated through 90 degrees in comparison with FIG. 1a, of the same phase modulator 1 according to the prior art. Here, three electrodes 4 lying next to one another are shown on the lower substrate 2. The actual number of electrodes 4, particularly in a variable deflection grating, may however be much greater. In this view, the electric field which can be applied between the electrodes 4 would lie in the plane of the drawing. By individual controlling of the individual electrodes 4, a variable deflection grating may for example be provided.

FIG. 2a shows, in a manner comparable to FIG. 1a, a configuration of a phase modulator 1 according to the invention. The configuration likewise comprises two glass substrates 2, 3 and electrodes 4 on the lower glass substrate 2. The electrodes 4 and the profile of the electric field correspond substantially to those of the phase modulator 1 of FIG. 1a.

The configuration likewise comprises two polyimide layers 7, 8 and a liquid crystal layer 9. The orientation of the LC molecules (=liquid crystal molecules) 10 close to the two surfaces 5, 6 differs, however, according to the invention from that of the prior art shown in FIG. 1. The LC molecules 10 close to the lower surface 5 are oriented at an angle $\alpha(0)$, and the LC molecules 10 close to the upper surface 6 are oriented at an angle $\alpha(d)$. The rotation sense (i.e. the sign) of the angle $\alpha(0)$, $\alpha(d)$ at the lower and upper surface 6, 5 is opposite.

In the exemplary embodiment, the magnitude of the angle $\alpha(0)$, $\alpha(d)$ at the two surfaces 5, 6 is the same. This corresponds to a mirror-image orientation of the LC molecules 10 at the upper surface 6 in comparison with the lower surface 5, an imaginary mirror plane 11 extending though the middle of the liquid crystal layer 9 and parallel to the substrates 2, 3, or their surfaces 5,6. For illustration, this mirror plane 11 is also indicated as a dashed line.

In other configurations (which are less preferred), the angles $\alpha(0)$ and $\alpha(d)$ may also have different magnitudes. For example, $|\alpha(0)|=20°$ and $|\alpha(d)|=40°$ would be possible.

Figure 2B:
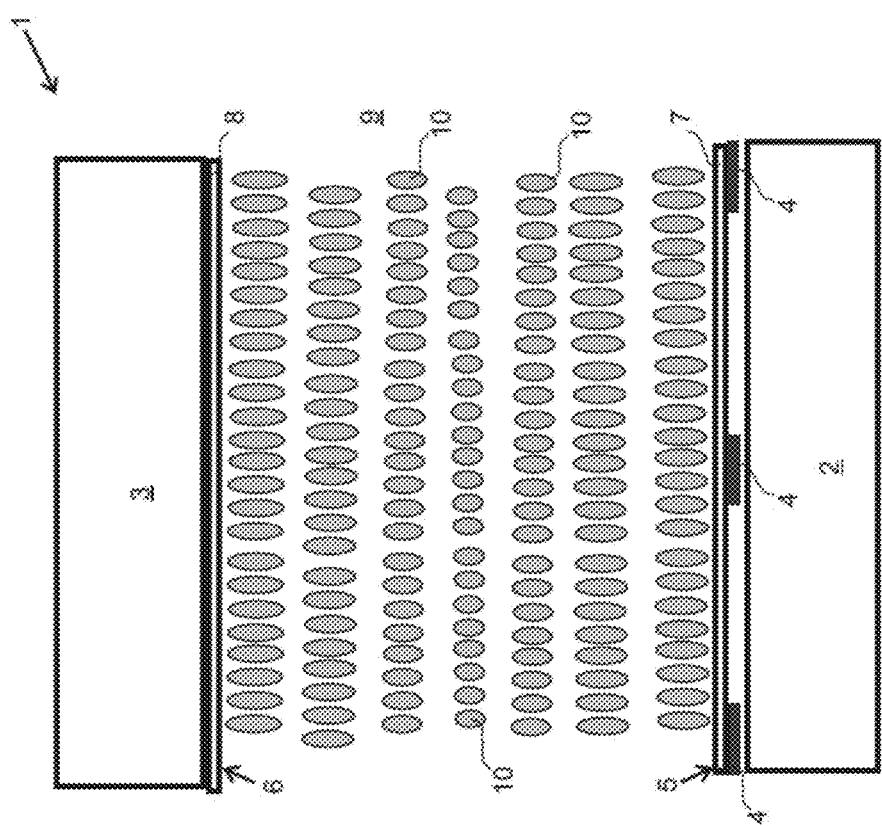
FIG. 2b is a sectional view, rotated 90 degrees, of the phase modulator of FIG. 2a with the electric field switched off.

FIG. 2b shows, in a manner comparable to FIG. 1b, a detail of the view, rotated through 90 degrees, of the exemplary embodiment of the phase modulator 1 according to the invention. Here as well, only three electrodes 4 are indicated schematically, standing for a larger number of electrodes.

In WO 2011/067265 A1, FIG. 1 thereof describes a phase modulation of circularly polarized light and an arrangement which acts as a $\lambda/2$ plate. FIG. 4 therein shows this arrangement with individually controllable electrodes for a variable deflection grating. FIG. 5 therein shows a polarization grating with a fixed grating period according to the prior art. FIGS. 9 and 10 therein show examples of voltages which are applied to the electrodes in order to produce deflection gratings with a particular grating period. These figures may analogously also be used to explain the present invention. To this extent, reference is made in respect of further comments to WO 2011/067265 A1, the disclosure content of WO 2011/067265 A1 being fully incorporated here.

Figure 3:
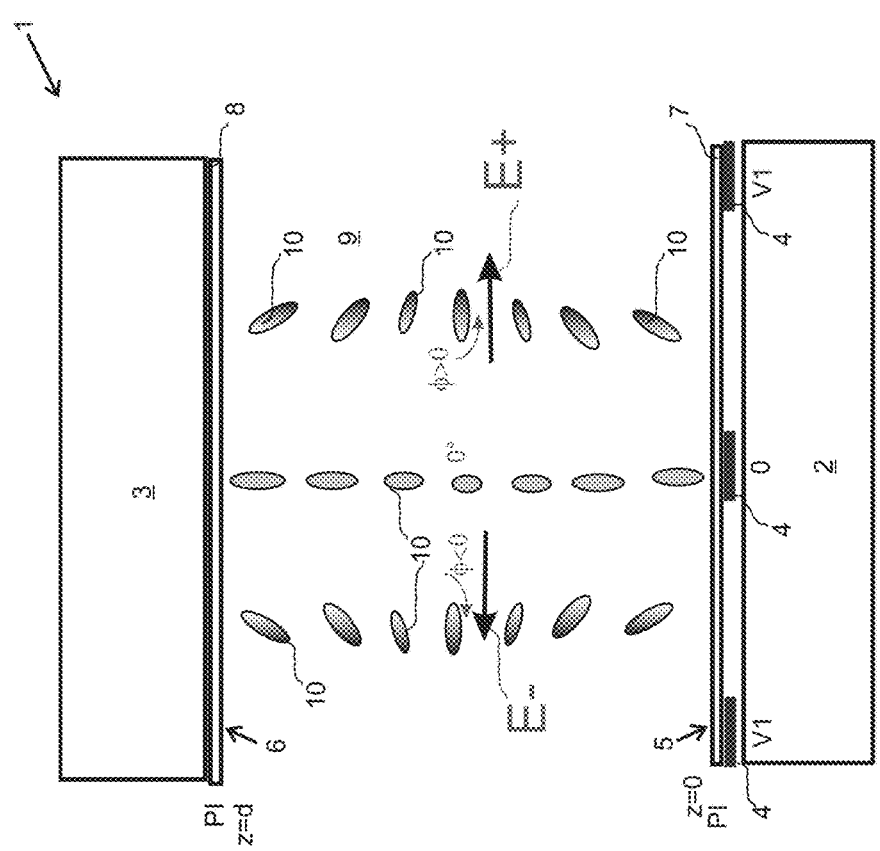
FIG. 3 is a sectional view of an exemplary embodiment of a phase modulator according to the invention with the electric field switched on, FIG. 4a is a sectional view of a second exemplary embodiment of a phase modulator according to the invention.

FIG. 3 shows very schematically sign-dependent rotation, induced by the flexoelectric polarization, of the LC molecules 10 in the electric field. In this example, the central electrode 4 is at 0 volts, and the left and right electrodes 4 are respectively at the same voltage V1. The sign of the electric field therefore differs in the left and right halves. Correspondingly, the rotation sense of the LC molecules 10 also differs in these halves of the detail of the phase modulator 1 as shown in FIG. 3. In a manner similar to FIG. 9 of WO 2011/067265 A1, a voltage sequence may be applied over a large number of electrodes 4 in order to produce a variable deflection grating.

Figure 4B:
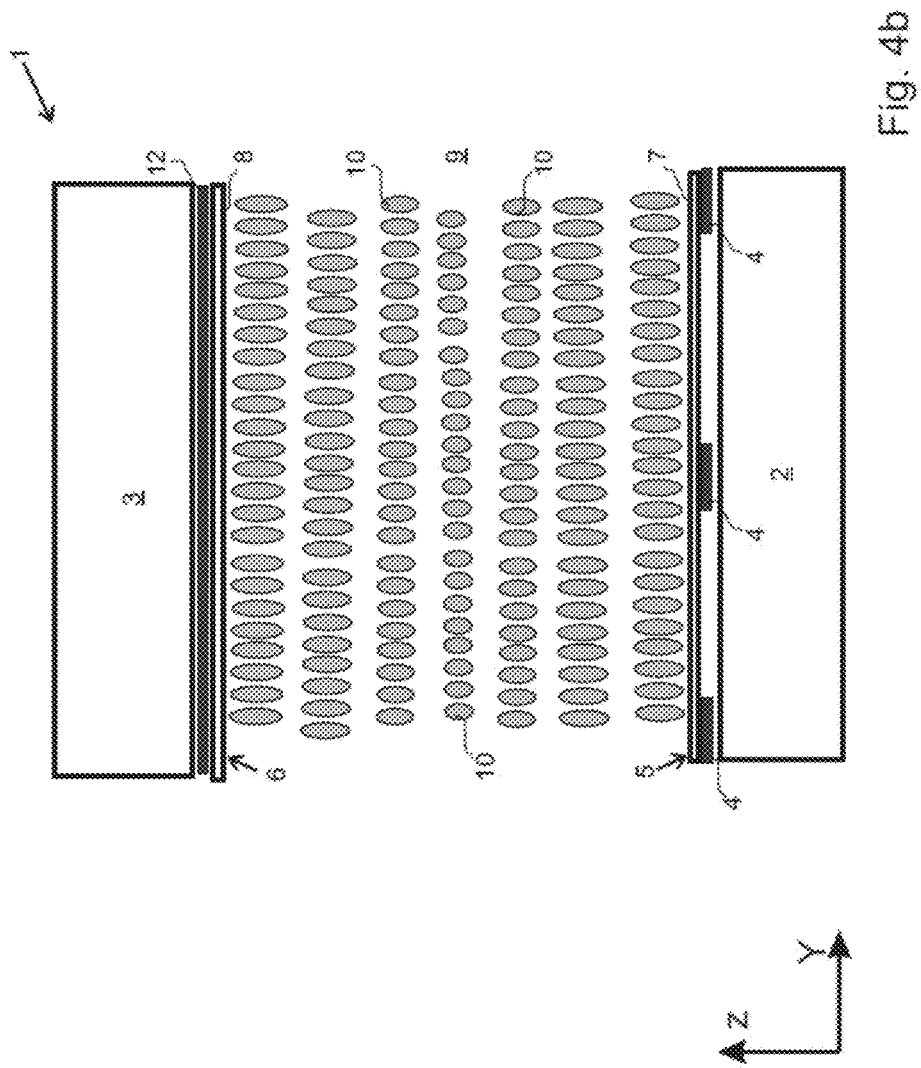
FIG. 4b is a sectional view, rotated 90 degrees, of the phase modulator of FIG. 4a with the electric field switched off.

FIGS. 4a and 4b show in two different views an arrangement similar to FIGS. 2a and 2b. In addition, here the upper substrate 3 contains further electrodes 12, which are arranged at an angle of approximately 90 degrees to the electrodes 4 on the lower substrate 2. A field between the electrodes 12 on the upper substrate 3 would thus in FIG. 4a lie approximately in the plane of the drawing and in FIG. 4b approximately perpendicularly to the plane of the drawing. FIG. 4b shows the orientation of the liquid crystals 10 when an electric field is applied neither to the lower electrodes 4 nor to the upper electrodes 12.

Figure 4C:
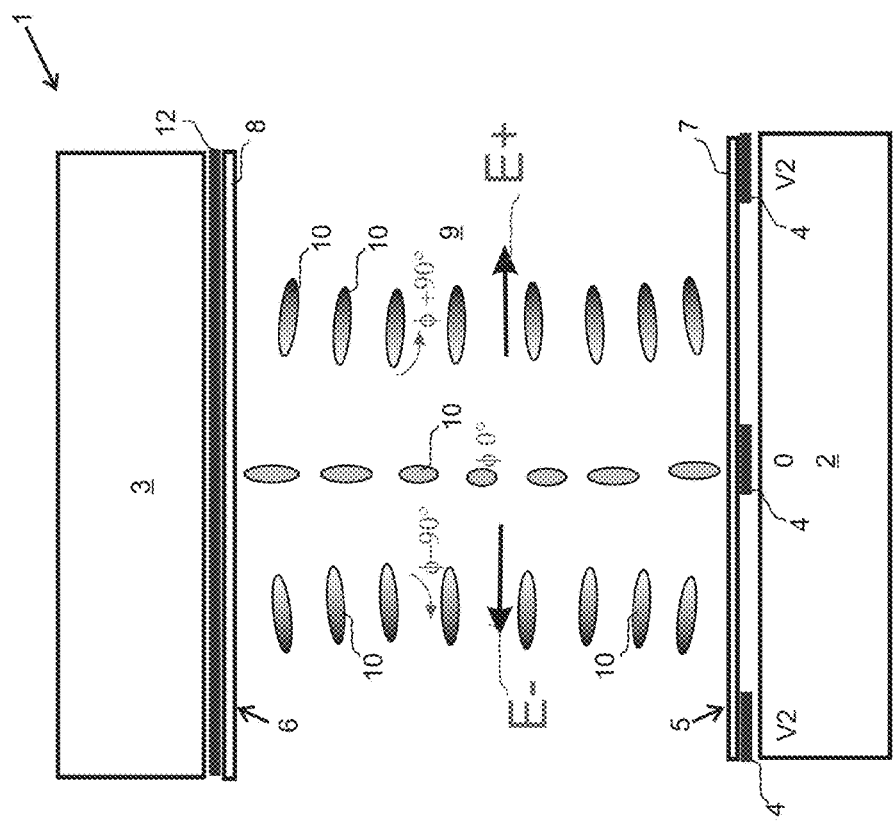
FIG. 4c is a sectional view of the phase modulator of FIGS. 4a and 4b with the electric field switched on, and FIGS. 5a to 5d illustrate various sectional views of a third exemplary embodiment of a phase modulator according to the invention.

FIG. 4c schematically shows, in the same view as FIG. 4b, the orientation of the liquid crystals 10 when an electric field is applied between the electrodes 4 on the lower substrate 2. In this exemplary embodiment, the material parameters of the liquid crystal are adjusted in such a way that it has a dielectric anisotropy of $\Delta\varepsilon \geq 5$. The flexoelectric coefficient es is, for example, approximately 10 pC/m. When an electric field is applied, an in-plane rotation of the LC molecules 10 takes place. Because of the flexoelectric polarization, the rotation direction of the LC molecules 10 is dependent on the sign of the electric field. This also applies for a combination of dielectric and flexoelectric interaction with the electric field. This is because the torque on the LC molecules 10 due to flexoelectric interaction behaves proportionally to the cosine of the angle between the polarization vector of the flexoelectric polarization of the LC molecules 10 and the E-field vector, i.e. it is greater when this angle is 90 degrees. The torque caused by the dielectric interaction, however, is proportional to the product of the cosine times the sine of the angle between the electric field of the orientation of the LC molecules 10. With an angle of exactly 90 degrees, this torque has a value of zero.

The ratio of the two torques, however, varies with the sine of the angle. Furthermore, with an increasing electric field, the dominance of the dielectric interaction increases. It thus dominates the dielectric interaction beyond a particular rotation angle, depending on the ratio $\Delta\varepsilon/e_s$.

In addition, in the case of a relatively strong electric field, the dielectric interaction advantageously also causes a change in the out-of-plane orientation of the LC molecules 10. Because of this change in the out-of-plane orientation with an increasing in-plane rotation angle, the splay deformation also becomes less and therefore the flexoelectric polarization also becomes less. With a sufficiently large $\Delta\varepsilon$ or a sufficiently large ratio $\Delta\varepsilon/es$, for rotation angles close to 90 degrees the LC molecules are then almost entirely oriented in-plane and the flexoelectric polarization is very small.

Rapid active rotation of the LC molecules 10 back to their original orientation then takes place with an electric field which is applied to the electrodes 12 on the upper substrate 3. When the parameters $\Delta\varepsilon$ and $e_s$ of the LC material are adjusted in such a way that the polarization becomes less with an increasing rotation angle, the dielectric interaction advantageously dominates for the rotation back (despite a modified angle of close to 90 degrees between the electric field and the LC orientation due to the modified direction of the electric field). In combination with the elastic forces in the liquid crystal and the surface anchoring, the LC molecules 10 are then rotated back into their original orientation independently of the sign of the electric field. Advantageously, the electrodes 12 on the upper structure 3 may have the structure of the inter-engaged combs. Individual controlling of the electrodes 12 on the substrate 3 is thus not necessary, rather it is merely necessary to apply a global voltage value between the combs. Advantageously, such a configuration also has a very rapid switching behavior, since the two switching processes, switching on and off, can respectively be controlled actively by an electric field.

On the other hand, the change in the optical path of light through the LC layer, which is caused by a modified out-of-plane orientation, is sufficiently small for the LC layer 9 to behave approximately as a λ/2 plate independently of the in-plane rotation angle. The diffraction efficiency of a variable deflection grating, or of the phase modulator 1, is thus only insubstantially reduced by the described configuration.

FIGS. 5a to 5d show an exemplary embodiment of a phase modulator 1, which may be used in the function of a spatial light modulator. In this exemplary embodiment, the phase modulator 1 is thus used not as a deflection grating but as a spatial light modulator (SLM) having a plurality of regularly arranged pixels 13 and having a phase value which can be adjusted as uniformly as over the surface of a pixel 13. FIGS. 5a and 5b respectively show a section along the lines 5a-5a and 5b-5b according to FIG. 5d of a phase-modulating pixel 13 of the phase modulator 1. FIG. 5d shows a sectional view of the pixel 13 along the line 5d-5d according to FIG. 5c, an electric field which also generates the alignment of LC molecules 10 shown in FIG. 5c in regions 14, 15 being applied to the electrodes 4 in FIG. 5d. The phase-modulating pixel 13 is divided into two regions 14, 15, which respectively have a mirror-symmetrically opposite orientation of the LC molecules 10 close to the surface 5 or 6, respectively. The approximate separation of the regions 14, 15 is indicated by the vertically dashed line in FIGS. 5c and 5d. In region 14, the LC molecules 10 are arranged, or aligned, on the lower side at an angle $\alpha(0)$ on the surface 5 and on the upper side on the surface 6 with an angle $\alpha(d)$. In region 15, the LC molecules 10 are arranged, or aligned, on the lower side at an angle $-\alpha(0)$ on the surface 5 and on the upper side on the surface 6 with an angle $-\alpha(d)$.

FIG. 5c shows a view, rotated through 90 degrees, of a pixel 13 (along the line 5c-5c in FIG. 5d) when an electric field is applied. The region 14 of the sectional view of FIG. 5a can be seen in the left-hand part of FIG. 5c. A region 15 of one of the two sections of FIG. 5b can be seen in the right-hand part of FIG. 5c.

Despite a modified direction of the electric field, uniform rotation of the LC molecules 10 takes place in both regions of the pixel 13, see the arrows indicated centrally between the surfaces 5, 6. A uniform phase value is thus generated in the entire pixel 13. A conventional electrode structure can then advantageously be used for the pixel 13.

In conclusion, it may more particularly be pointed out that the configurations explained above merely serve to describe the claimed teaching, but do not restrict it to the configuration. In particular, configurations described above could—insofar as is possible—be combined with one another.

The invention claimed is:

1. A phase modulator for polarized light, comprising:
   a first substrate having a first surface and a second substrate having a second surface, the two substrates being arranged facing one another,
   a liquid crystal layer arranged between the two substrates, said liquid crystal layer comprising liquid crystal molecules,
   an electrode arrangement on at least one of the substrates,
   the two surfaces of the substrates being configured in order to orientate the liquid crystal molecules next to the respective surface in a direction which respectively forms an out-of-plane angle with the respective surface of the respective substrate, and
   the electrode arrangement is controllable in such a way that an in-plane component φ of the liquid crystal molecule orientation is adjustable selectively as a function of the sign of the electric field in an angle range of up to 180 degrees.

2. The phase modulator according to claim 1, wherein the sign of the out-of-plane angle next to the first surface is opposite to the sign of the out-of-plane angle next to the second surface.

3. The phase modulator according to claim 1, wherein the phase modulator is provided for circularly polarized light, where the phase of circularly polarized light is modulated.

4. The phase modulator according to claim 1, wherein the magnitude of the out-of-plane angle is more than 0 degrees but less than or equal to 45 degrees.

5. The phase modulator according to claim 1, wherein a flexo-electric polarization is generated in the liquid crystal layer by a splay deformation of the liquid crystal molecules.

6. The phase modulator according to claim 1, wherein the liquid crystal layer, which is arranged between the two substrates comprises a different alignable birefringent material in addition to the liquid crystal molecules.

7. The phase modulator according to claim 1, wherein the in-plane component is adjustable between $-\varphi_1$ and $+\varphi_2$ degrees in relation to a predeterminable average orientation, with $\varphi_1$, $\varphi_2 \leq 90$ degrees, in particular with 70 degrees $\leq \varphi_1$, $\varphi_2 \leq 90$ degrees.

8. The phase modulator according to claim 7, wherein splay deformation is provided across the liquid crystal layer.

9. The phase modulator according to claim 1, wherein the two out-of-plane angles are equal in magnitude but differ in sign.

10. The phase modulator according to claim 1, wherein a magnitude of the two out-of-plane angles is provided which respectively lies in a range of between 20 and 40 degrees.

11. The phase modulator according to claim 1, wherein individually controllable electrodes are provided on the first substrate.

12. The phase modulator according to claim 1, wherein an in-plane electrode arrangement is provided on the two substrates, the electrodes on the first substrate being oriented at a relative angle of 90 degrees with respect to the electrodes on the second substrate.

13. The phase modulator according to claim 12, wherein an electrode arrangement is provided on the second substrate in the form of two inter-engaged combs or comb-like structures, between which a global voltage value can be adjusted.

14. The phase modulator according to claim 1, wherein a liquid crystal layer is provided which comprises a liquid crystal material with a dielectric anisotropy Δε greater than or equal to 5.

15. The phase modulator according to claim 1, wherein a liquid crystal layer is provided which comprises a liquid crystal material with a dielectric anisotropy Δε less than or equal to 0.2 and a splay flexoelectric coefficient $e_s$ greater than or equal to 20 pC/m.

16. A spatial light modulator comprising a phase modulator according to claim 1, wherein a multiplicity of pixels are arranged regularly next to one another therein, a uniform adjustable phase value respectively being generated over the entire surface of a pixel.

17. The spatial light modulator according to claim 16, wherein each pixel is divided into two regions, which respectively have a mirror-symmetrically opposite orientation of the liquid crystal molecules near the surfaces of the substrates.

18. A holographic display comprising at least one of the following: a phase modulator according to claim 1 and a spatial light modulator according to claim 16.

* * * * *